United States Patent [19]

Yamaguchi

[11] 3,828,130

[45] Aug. 6, 1974

[54] DATA TRANSMITTING SYSTEM

[75] Inventor: Taihei Yamaguchi, Kawasaki, Japan

[73] Assignee: Fuji Electric Company Limited, Kawasaki-shi, Kanagawa, Japan

[22] Filed: Apr. 13, 1973

[21] Appl. No.: 350,865

[30] Foreign Application Priority Data

Apr. 14, 1972 Japan ............................... 47-37425

[52] U.S. Cl. 178/69.5 R, 340/146.1 AV, 340/146.1 D

[51] Int. Cl. ............................................. H04l 7/06

[58] Field of Search...... 178/69.5 R; 340/146.1 AV, 340/146.1 D

[56] References Cited

UNITED STATES PATENTS 3,305,636 2/1967 Webb.......................... 340/146.1 D

*Primary Examiner*—Malcolm A. Morrison
*Assistant Examiner*—R. Stephen Dildine, Jr.
*Attorney, Agent, or Firm*—Sughrue, Rothwell, Mion, Zinn & Macpeak

[57] ABSTRACT

A data transmitting system disclosed here belongs to a method defined as a so-called serial data transmitting method for transmitting the data by converting it to a serial binary signal, and is composed as follows: data information is converted into a serial binary signal which is transmitted from the transmitting side to a first circuit of the signal transmission line at the same time an auxiliary signal formed by synthesizing logically the above data information and bit synchronous information synchronous therewith is transmitted to a second circuit of the signal transmission line, the data signals transmitted from the first and second circuits of the above signal transmission line and the auxiliary signal are compared logically so as to extract bit synchronous information at the receiving side; timing signals for extracting a bit are formed by the bit synchronous information signal; and the bit information of the data signal transmitted by way of the first circuit is, under the control of these timing signals extracted simultaneously with the measurement of the time interval of the timing signals and number signals, timing thereby detecting any error in the bit information of the data thus transmitted.

5 Claims, 4 Drawing Figures

DATA TRANSMITTING SYSTEM

BACKGROUND OF THE INVENTION

This invention relates to a data transmitting system used in a data processing system, and more particularly to a data transmitting system adapted for transmitting the data by converting it into a serial binary signal.

Since a so-called serial data transmitting system for transmitting the data by converting it into a serial binary signal reduces the number of required signal transmission lines, it is generally applied to the transmission between stations separated by a long distance. As the transmitting time and distance of the information in case of such serial transmitting systems become longer than those in the case of a so-called parallel data transmitting system for transmitting the data by converting it into parallel binary signal, errors in the information tend to be generated to that during data transmission. Therefore, in order to enhance the reliability of the data transmission in the serial data transmitting system, it is indispensable to detect the error in the transmission of the information. It is well known in the serial data transmitting system for the error in the transmission of the information to be detected by redundantly transmitting plural data signals in serial or parallel and by collating the transmitted plural data signals at the receiving side.

However, since the information transmitting time becomes even longer in a serial transmitting system when plural data signals are transmitted redundantly for the purpose of detecting the error in the transmission of the information, the transmitting efficiency is decreased, and there is required at the same time a temporary memory unit for storing the redundancy number, i.e., the number of serial transmissions of the same data signals, at the receiving side, and accordingly the construction of the system is complicated and its cost becomes expensive. In a transmitting system for redundantly transmitting the same plural data signals in parallel, a number of signal transmission lines are required, thereby increasing the expense for the signal transmission lines. Further, since the data signal and the collating data signal are transmitted in parallel, the respective signals are sequentially collated adjacently to each other, but if the transmitting speed becomes higher, the transfer of the signal phase and the jitter which occur due to the characteristics of the signal transmission line make collation large so as sometimes to become impossible, thereby resulting in a lack of reliability of the detection of an error.

In addition, a timing signal for extracting the bit information from the transmitted serial binary date signal of the data transmitted must be provided at the receiving side in a serial data transmitting system. For this purpose, there has been used a method for transmitting the timing signal by timely inserting a pilot signal in the data signal or by way of another separate signal transmission line. However, in the method for routing the signal by inserting the pilot signal thereinto, the circuit for extracting the pilot signal becomes complicated, and an accurate timing element must be provided at the receiving side in order to form the timing signal based on the pilot signal. Further, in the method for transmitting a timing signal through another signal transmission line, an additional signal transmission line is required, and the timing signal may be of synchronization due to the effect of the characteristics and signal jitter of the signal transmission line in case of high speed transmission, and accordingly this method cannot be used in high speed transmission.

SUMMARY OF THE INVENTION

It is an object of the present invention to provide an improved data transmitting system to eliminate various disadvantages of the conventional transmitting systems as described above.

It is another object of the present invention to provide a data transmitting system which has small redundancy of signal and is capable of detecting an error with high reliability. It is still another object of this invention to provide a data transmitting system which is simple in construction and highly economical.

The data transmitting system of this invention comprises two signal transmitting line circuits, wherein data information is converted into a serial binary signal and is then routed to the first transmission circuit line from a data transmitting section, and simultaneously an auxiliary signal, formed by synthesizing logically the data information and bit synchronous information, is fed synchronously therewith to the second transmission line circuit, so that a bit synchronous information signal is extracted from the data signal transmitted from the first circuit and from the auxiliary signal transmitted from the second circuit at a data receiving section, so as to form a timing signal for extracting the bit information based on the bit synchronous information signal, and the data signals transmitted by way of the first circuit in accordance with the timing signal are sequentially extracted, and simultaneously the content of the bit synchronous information signal is checked, thereby detecting any error in the transmission.

According to the optimum embodiment of the present invention, the synthesis of the data information and bit synchronous information at the transmitting section is executed by an exclusive "or" circuit, and the extraction of the bit synchronous information at the receiving section is executed by providing an exclusive logical sum of the data signal and the auxiliary signal. The check of the extracted bit synchronous information for detecting the error at the receiving section is simply executed by counting the number of generated timing signal formed based on the bit synchronous information. In this case, a counting circuit for counting the timing signals may be so constructed as to be reset by a receiving end signal generated from a time measuring circuit for measuring the time interval of the generation of the timing signals when this interval becomes longer than a predetermined time.

According to the present invention, since the data information is routed to the first signal transmission line circuit, and since the auxiliary information, formed by synthesizing the data binary information and the bit synchronous information, is fed to the second transmission line circuit, so that the bit synchronous information is extracted from two signals routed from the first and second circuits at the receiving section so as to form a timing signal from the extracted bit synchronous information with the result that the data bit information is extracted, under the control of the timing signal, from the data signal fed from the first circuit so that the extracted bit synchronous information is checked thereby detecting the error of the transmission, even if a time delay has occurred between the data signal of the first circuit and the data signal of the second circuit because of irregular characteristics of the signal transmission lines and signal jitter, the extracted bit information does not become out of synchronization, thereby assuring the accurate detection of any error in the transmission. Since the present invention only feeds to the second transmission line the auxiliary information obtained by synthesizing the data information and the bit synchronous information, to the second circuit and because of the detection of any error in the transmission and of the synchronization of the bit information, the redundancy of the information therefore may become remarkably small in both the serial and parallel systems, and accordingly the transmitting efficiency may be enhanced.

These and other objects, features and advantages of the present invention will become more fully apparent from the following description taken in conjunction with the accompanying drawings.

DETAILED DESCRIPTION OF THE PREFERRED EMBODIMENTS

Figure 1:
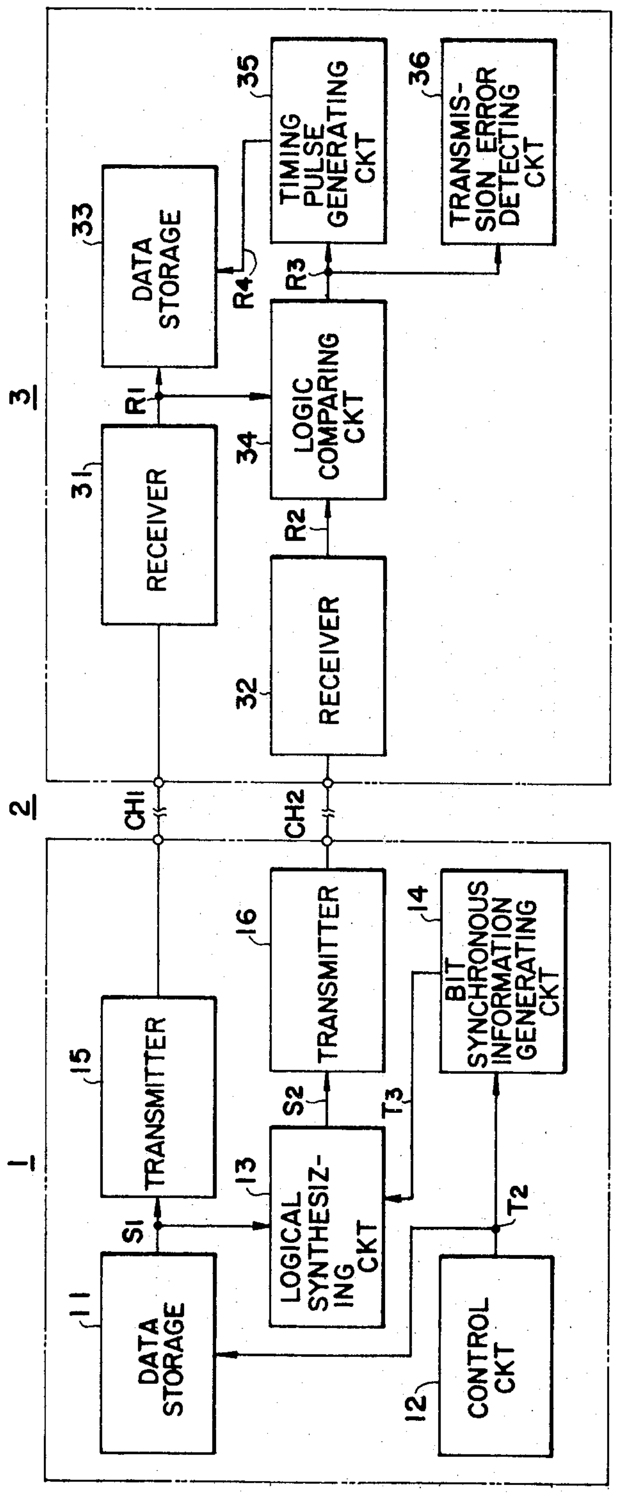
FIG. 1 is a block diagram of a fundamental constitution of the data transmitting system according to one embodiment of the present invention.

In a data transmitting system constructed according to the present invention shown in FIG. 1, a data transmitting section is designated by numeral 1, and a data receiving section by 3, and this data transmitting section 1 and data receiving section 3 are connected by a signal transmission line 2 having two circuits CH1 and CH2.

In the data transmitting section 1, numeral 11 represents a data storage, which stores data to be transmitted. This data storage 11 reads out data binary information stored therein one bit by one bit in a constant period under the control of incremental pulse signals T2 supplied from a control device 12 so as to form a data serial binary signal S1. This signal S1 is converted into a proper transmitting signal by transmitter 15, and is routed to the first circuit CH1 of the signal transmission line. On the other hand, the data signal S1 and a bit synchronous information signal T3, generated by a bit synchronous information generating circuit 14 in response to the incremental pulse signal T2 generated by the control circuit 12, are logically synthesized by a logical synthesizing circuit 13 so as to form a serial binary signal S2 containing the auxiliary information thus formed. This auxiliary signal S2 is similarly converted into a proper transmitting signal by a transmitter 16, and is routed to the second circuit CH2 of the signal transmission lines 2.

The signals thus routed to the signal transmission line 2 are received by receivers 31 and 32 provided in the receiving section 3, in which receivers the signals are again converted into binary signals. The received data signal R1 fed out of the receiver 31 is applied to the input of data storage 33 and to one comparison input of logic comparing circuit 34. To the other comparison input of the logic comparing circuit 34 is applied received auxiliary signal R2 fed out of the receiver 32, and the received data signal R1 and the received auxiliary signal R2 are logically compared in the comparing circuit 34. In other words, as the received auxiliary signal R2 has both a data signal S1 component and a bit synchronous information signal T3 component, since it corresponds to the original auxiliary signal S2 fed from the transmitting section 1, the comparing operation causes the data signal S1 component to be subtracted from the auxiliary signal R2 by the logical operation so as to extract only the bit synchronous information signal T3 component. Therefore, the bit synchronous information signal is reset and extracted as a signal R3 from the comparing circuit 34. A timing pulse generating circuit 35 generates a timing pulse signal R4 showing accurately the time point for extracting the bit information based on the extracted bit synchronous information signal R3 so as to apply it to incremental input of the data storage 33. For this reason, the data storage successively reads out the bit information of the received data signal R1 in synchronization with the transmitting period of the information every time the timing pulse signal R4 is generated. Since a predetermined content is provided in the bit synchronous information signal T3, it is normally transmitted, and if an error is not generated, the bit synchronous information signal R3 extracted in the receiving section 3 also has the predetermined content. A transmission error detecting circuit 36 detects any transmission error by checking whether the content of the extracted bit synchronous information signal R3 is the same as or different from the predetermined content by utilizing the above fact.

Figure 2:
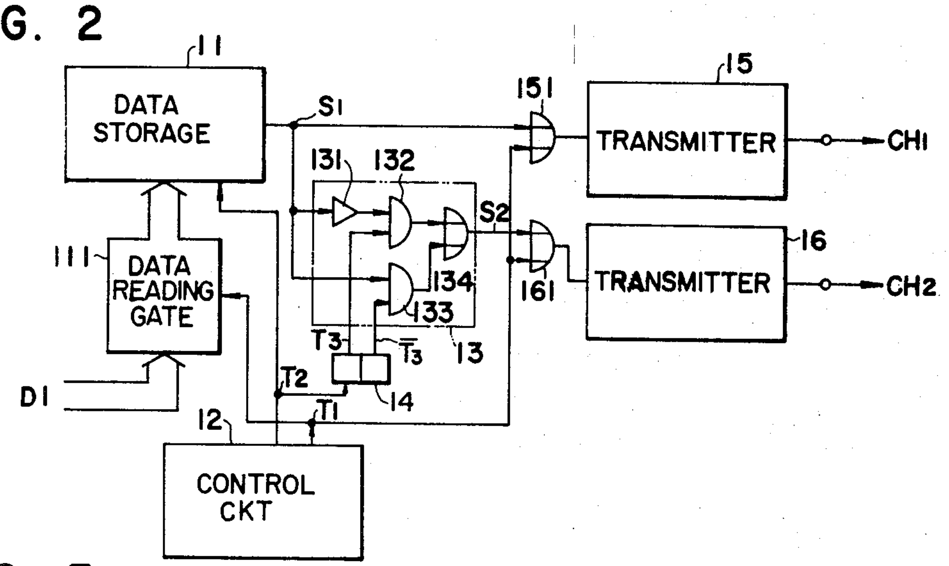
FIG. 2 is a block diagram of one embodiment of the data transmitting section used in the data transmitting system of the present invention.
Figure 3:
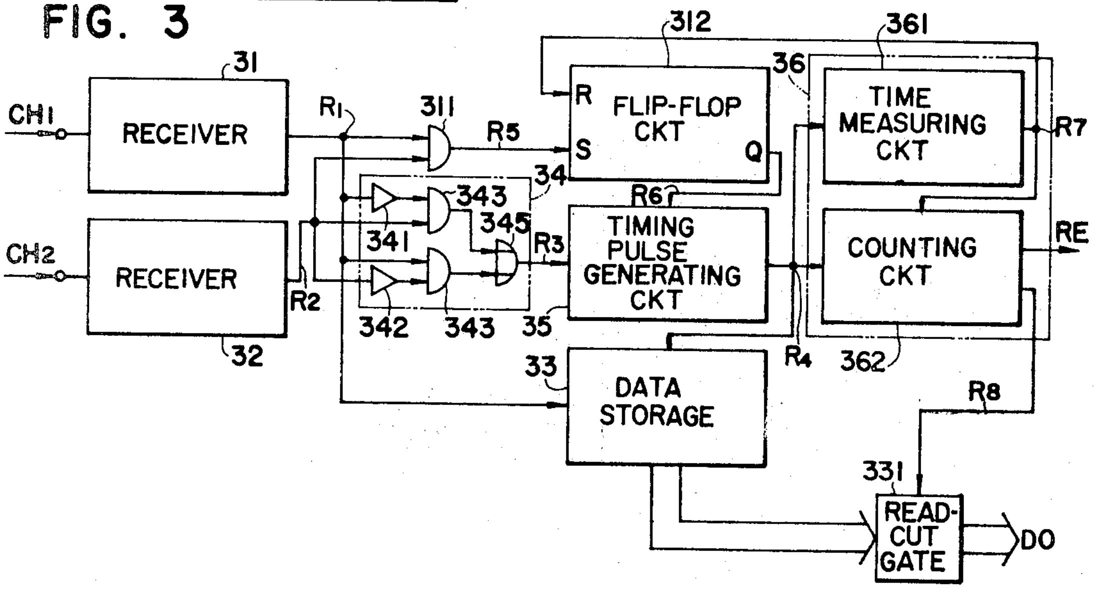
FIG. 3 is a block diagram of one embodiment of the data receiving section used with the data transmitting section shown in FIG. 2.
Figure 4:
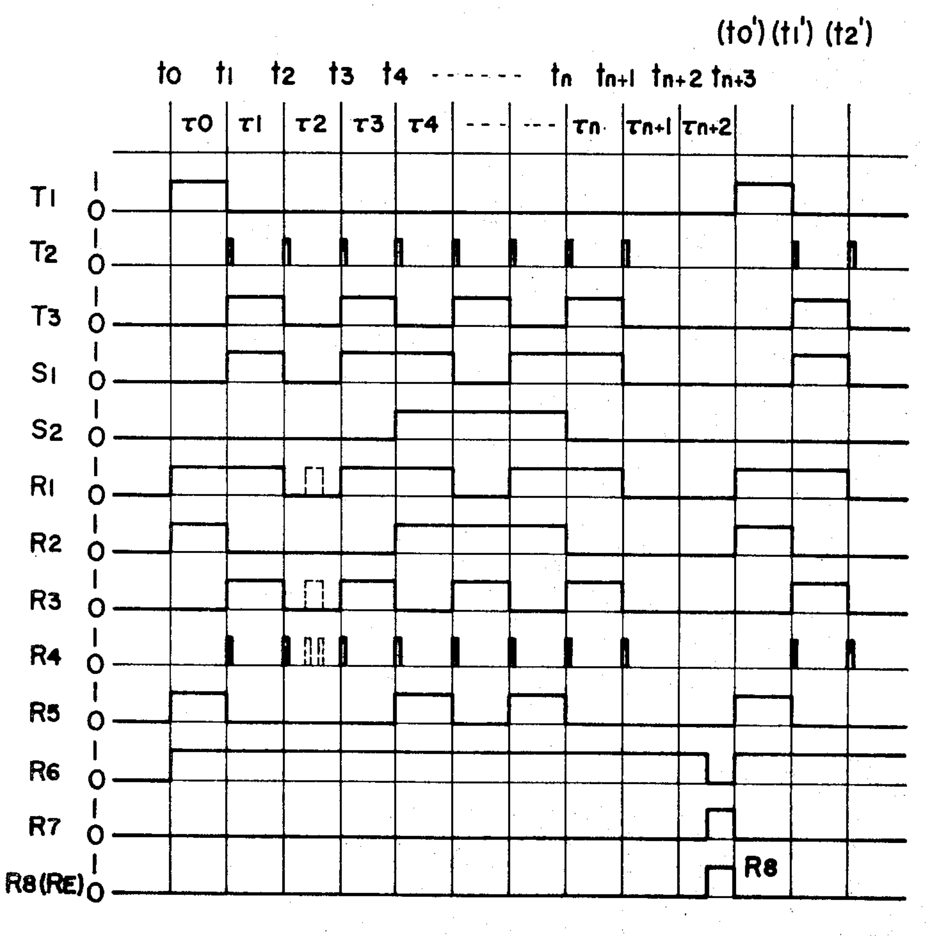
FIG. 4 is a time chart of the signals at the respective parts of the transmitting section shown in FIG. 2 and the receiving section shown in FIG. 3.

A more of the data transmitting section 1 of data transmitting system of the present invention is shown in FIG. 2, and a more detailed circuit of the data receiving section 3 is shown in FIG. 3, wherein the same reference numerals have been used in FIGS. 2 and 3, as those used in FIG. 1, to represent corresponding parts, and the operation of the transmitting and receiving sections shown in FIGS. 2 and 3 will now be described with reference to FIG. 4 showing the time chart of the respective signals of the transmitting and receiving circuits.

At the beginning of the transmission, the control circuit 12 in the transmitting circuit in FIG. 2 generates a starting signal T1 of binary "1" as shown by T1 in FIG. 4 during starting duration $\tau o$. This starting signal T1 is applied to a data reading gate 111 and to both transmitters 15 and 16. The gate 111 is opened by the starting signal T1 so that data input DI having n bits of binary information is read out by the data storage 11 composed of shift registers. Simultaneously, the transmitters 15 and 16 send the starting signal T1 of binary "1" out to both the first and second circuits CH1 and CH2 of the transmission line 2. Then, the incremental pulse signal T2 is routed from the control circuit 12 to the shift register in data storage 11 and to the bit synchronous information signal generating circuit 14 composed of a flip-flop (one bit counter) at the initial time points of the respective transmitting durations, namely, at each of the time points $t1$ to $tn$. Thus, $n$ bits of binary information stored in the shift register are read out one by one in a period $\tau$ of the incremental pulse signal T2, and are converted to a serial binary signal S1. Since the flip-flop 14 inverts its state every time when one incremental pulse signal T2 is applied thereto, it feeds out the bit synchronous information signal T3 as binary 1 and 0 alternatively in the respective continuous durations of $\tau 1$ to $\tau n$ as shown by T3 in FIG. 4. This signal T3 and the data signal S1 are added to the signal synthesizing circuit 13 consisting of NOT circuit 131, AND circuit 132 and OR circuit 134, and are logically synthesized therein. In this synthesizing circuit 13 are obtained a logical sum of the logical product of negative value $\overline{S1}$ of the signal S1 and the signal T3 obtained by one AND circuit 132, and of the logical product of the signal S1 and the negative value $\overline{T3}$ of the signal T3 obtained by the negative output stage of the flip-flop 14 obtained by the other AND circuit 133. Therefore, the auxiliary signal S2 synthesized by the synthesizing circuit 13 becomes the exclusive logical sum of the signals S1 and T3 as shown by S2 in FIG. 4. Then, the above data signal S1 and the auxiliary signal S2 are applied by way of the respective transmitting gates 151 and 161 to the transmitters 15 and 16, and are converted to a proper transmission signal here, and then fed to the circuits CH1 and CH2 of the signal transmission line over the durations $\tau 1$ to $\tau n$ subsequent to the starting duration $\tau o$.

The receiving circuit for receiving the signal fed out of the above transmitting circuit is shown in FIG. 3.

The receivers 31 and 32 in the receiving circuit receives the signals routed by way of the respective circuits CH1 and CH2 of the signal transmission line. The received output signals R1 and R2 of the receivers 31 and 32 are applied to the comparing circuit 34 for extracting the bit synchronous information signal from the received output signal R2 corresponding to the auxiliary signal S2 and to the AND circuit 311 for detecting the starting signal. Further, the received output signal R1 is also applied to the data storage 33 composed of shift registers. The output signal R5 of the AND circuit 311 is applied to the set input S of the set and reset type flip-flop 312, and the output signal R6 of the flip-flop 312 is applied to the operation control input of the timing signal generating a circuit 35 for generating timing signal based on the output signal R3 of the comparing circuit 34. The output signal R4 of the timing signal generating circuit 35 is applied to the transmission error detecting circuit 36 and to the incremental input of the shift register 33. The transmission error detecting circuit 36 has a time measuring circuit 361 for measuring the duration of the timing signal and a counting circuit 362 for counting the number of generated timing signals.

If an error is not generated in the transmitting step, the received output signals R1 and R2 become binary 1 in the initial duration $\tau o$ in the receiving circuit thus formed as shown by R1 and R2 in FIG. 4, and become the same content as the data signal S1 and the auxiliary signal S2 sent from the respective transmitting circuits in subsequent duration $\tau 1$ to $\tau n$. Accordingly, as the AND circuit 311 satisfies the "and" condition in starting duration $\tau o$ to apply a binary 1 signal R5 to the set input S of the flip-flop 312, the flip-flop 312 generates a binary 1 signal R6 which is applied to the timing signal generating circuit 35. For this reason, the timing signal generating circuit 35 enters the operating state. The signals R1 and R2 applied to the AND circuit 311 may become the state for satisfying the "and" condition of the AND circuit even in the subsequent durations, but since the flip-flop 312 is already in the set state, it cannot affect the subsequent operation.

Since the comparing circuit 34 for comparing the received output signals R1 and R2 consists of an exclusive "or" circuit composed of NOT circuits 341 and 342, AND circuits 343 and 344, and OR circuit 345, the output signal R3 of the comparing circuit 34 is equivalent the to exclusive "or" of the signals R1 and R2. For this reason, the signal R3 obtained from the comparing circuit 34 is a binary 0 in the duration $\tau o$ as shown by R3 in FIG. 4, since the signals R1 and R2 are the same as the starting signal binary 1. And, since the signals R1 and R2 respectively take the content of the data signal S1 and the auxiliary signal S2, which takes the exclusive "or" of signal S1 and the bit synchronous information signal T3, in the respective durations of $\tau 1$ to $\tau n$ subsequent thereto, the following logical equation is concluded:

$$R_3 = R_1 \oplus R_2 = S_1 \oplus S_2 = S_1 \oplus (S_1 \oplus T_3) = T_3$$

Therefore, the output signal R3 of the comparing circuit 34 becomes binary 1 and 0 alternatively as the content of the respective durations of $\tau 1$ to $\tau n$, similar to the bit synchronous information signal T3.

The bit synchronous information signal R3 thus extracted is applied to the timing signal generating circuit 35 consisting of a logical differentiating circuit. Since the timing signal generating circuit 35 is already in the operating state in the duration $\tau o$, it differentiates the signal R3 in the respective durations of $\tau 1$ to $\tau n$ so as to generate the differentiating signal which becomes the timing pulse signal R4 at the respective time points of $t1$ to $tn+1$ for changing the state of the signal R3. The shift register in data storage 33 receives the timing pulse signal R4 so as to read out the bit information of the signal R1, i.e., data signal S1, in the respective durations of $\tau 1$ to $\tau n$ while shifting out bits one by one. The information read out by the shift register is read out by the read-out signal R8 for showing that the transmission error detecting circuit 36 operates without error, as will become more apparent in greater detail.

The transmission error detecting circuit 36 has a time measuring cirsuit 361 for measuring the duration of the generating time of the timing pulse signals R4 and a counting circuit 362 for counting the generated number of the signals. Here, the respective information bits of the data are transmitted in a predetermined transmitting period $\tau$, and the timing pulse signal R4 generated in every transmitting period is generated at the time duration equal to the transmitting period $\tau$ when the transmission is normally executed without error, and the generated number of the signals is $n + 1$ when $n$ is odd, while it is $n$ when $n$ is even corresponding to the bit number $n$ of the data transmitted. Therefore, if the duration of the generating time and generated number of the timing pulse signals R4 from the start of receiving to the end of receiving are measured by the time measuring circuit 361 and the counting circuit 362 and are compared with a predetermined number, the transmission error may be detected.

When the time of about 1 to $5\tau$ is set in the time measuring circuit 361 of this embodiment for the information transmitting period $\tau$ and the time duration of the pulse signal applied thereto becomes longer than the set time, it so operates as to generate a reception end signal R7 which resets the counting operation of the counting signal 362 at the same time it operates to reset the flip-flop 321. In the counting circuit 362 is set the number of the generated timing pulse signals unequivocally determined by the bit number of the data previously transmitted, and it so operates that when the counting content coincides with the set value, it generates read-out signal R8 so as to apply it to read-out gate 331 of the shift register 33, while when it does not coincide therewith, it generates error detecting signal RE so as to indicate the generation of transmission error.

The operation of the error detecting circuit 36 is as follows: If a transmission error has not taken place in the duration of $\tau 1$ to $\tau n$ when the information is transmitted, the time intervals of the timing pulse signal R4 become equal to the transmitting period $\tau$ and accordingly shorter than the set time $1.5\tau$ in the time measuring circuit 361. Therefore, the measuring circuit 361 cannot generate the signal R7 during this duration. However, since the information transmission ends at the time point $tn+1$ for generating the final pulse signal R4, the pulse signal R4 is not generated after this time point. For this reason, the signal R7 for showing the end of the information transmission is generated by the time measuring circuit 361 at the intermediate time point of the duration $\tau n + 2$ when the time of $1.5\tau$, set from the time tn+1 has lapsed so as to be applied to the counting circuit 362 of the information transmission error detecting circuit 36 and to the reset input of the flip-flop 312. Thus, the counting circuit 362 stops its counting operation at the same time the flip-flop 312 inverts its content to binary 0 so as to stop the operation of the timing signal generating circuit 35. Then, the counting circuit 312 counts the number of the timing pulse signals R4 generated from the start of the transmission to the generation of the end signal R7 by the time measuring circuit 361. When the transmission is normally executed without error, the counting content of the counting circuit 362 coincides with the set value so as to generate the read-out signal R8. Thus, the read-out gate 331 is opened so that all information bits read out by the shift register 33 are read out simultaneously in parallel so as to obtain the received output data DO.

However, as shown by S1 in FIG. 1, for example, if a transmission error is generated within the transmitting period $\tau$, such as the generation of a noise signal corresponding to a binary 1 as designated by dotted line in FIG. 4 in the received output signal R1 of duration $\tau 2$ of the receiving circuit, even though a data signal S1 equal to a binary 0 is fed out in the duration $\tau 2$ from the transmitting circuit, the output signal R3 of the comparing circuit 34 varies as shown by a dotted line in the drawing, and accordingly two excess pulse signals R4 are generated from the timing pulse signal generating circuit 35 during the duration $\tau 2$. Since the duration of the generating time of the timing pulse signal R4 becomes shorter than the time $1.5\tau$ set in the time measuring circuit 361 based on the transmission error of this case, the time measuring circuit 361 cannot generate the end signal R7 from the timing pulse signal based on the transmission error, but the counting circuit 362 detects the fact that the number of the generated pulse signal R4 is more than the set value after the end of the reception and does not correspond thereto, and immediately error signal RE is generated from the counting circuit 362 with the result that an error in the transmission is indicated. When an error of more than one transmitting period for vanishing the transmitting information is, for example, generated in one transmitting period, the bit synchronous information signal R3 produced by the comparing circuit 34 does not invert its content in the transmitting period, but keeps the same content as the previous transmitting period, and accordingly the timing pulse signal R4 is not generated in the transmitting period, and for this reason, the duration of the generating time becomes longer than the set time. If this is detected by the time measuring circuit 361, the reception end signal R7 is generated even during a transmission. The number of the timing pulse signals R4 generated at this time point is naturally smaller than the set value and does not coincide with the set value, and accordingly the counting circuit 362 immediately generates the error detecting signal RE so as to indicate the generation of a transmission error.

Incidentally, in this embodiment of the present invention, the following data transmission can be started from the time point $tn+3$ in FIG. 4. According to the data transmitting system of the present invention, when n bits of data are transmitted in a transmitting period $\tau$, there is required a transmitting time of $(n + 3)\tau$, but since it is not necessary to timely provide any other redundancy, the transmitting time per data may be shortened so as to enhance the transmitting efficiency.

As is clear from the above description of the embodiments of the present invention, according to the data transmitting system of the present invention, since it receives the data signal and the auxiliary signal transmitted from the transmitting section to the receiving section, extracts the bit synchronous information signal from these two signals, and generates a timing signal for extracting the data signal transmitted according to the bit synchronous information signal, it has the effect that maintains the synchronization of the signal without providing the accurate time element in both the transmitting and receiving sections. It does not need serial redundancy and an information memory as required heretofore in a conventional data transmitting system by the parallel transmitting collating method, but has the error detecting function equivalent thereto in accuracy. Therefore, the data transmitting system according to the present invention has simple construction, high reliability, and possibility of high speed transmission.

We claim:

1. A data transmitting system comprising: two signal transmission line circuits; a data transmitting section for converting data information to a serial binary signal to send the signal to said first circuit and for sending an auxiliary signal, formed by logically synthesizing the data information and bit synchronous information, to said second circuit synchronously with said serial binary signal; a data receiving section for extracting a bit synchronous information signal from the data signal transmitted from said first circuit and from the auxiliary signal transmitted from said second circuit to form a timing signal for extracting the bit information signal to subsequently read out, under the control of the binary signal the data signal transmitted from said first circuit and simultaneously to check the content of the extracted bit synchronous information signal to detect any error in transmission.

2. A data transmitting apparatus comprising: two signal transmission line circuits; a data transmitting device including means for converting data information to a serial binary signal and feeding it out to said first circuit, and means for logically synthesizing the data information and the bit synchronous information to form an auxiliary signal and to feed it out to the second circuit; and a data receiving device including: means for logically comparing the data signal transmitted from said first circuit and the auxiliary signal transmitted from said second circuit to extract a bit synchronous information signal; means for forming from the extracted bit synchronous information signal a timing signal for extracting the bit information; means for subsequently reading out, under the control of the timing signal, the data signal transmitted from said first circuit; and means for checking the contents of the extracted bit information signal, thereby detecting any error in transmission.

3. A data transmitting apparatus comprising: two signal transmission line circuits; a data transmitting device including: means for converting data information to a serial binary signal and feeding it out to said first circuit, and means for logically synthesizing the data information and the bit synchronous information by way of an exclusive logical "or" circuit to form an auxiliary signal and to feed it out to said second circuit; and a data receiving device including: means for logically comparing the data signal transmitted from said first circuit and the auxiliary signal transmitted from said second circuit to extract a bit synchronous information signal; means for forming from the extracted bit synchronous information signal a timing signal for extracting the bit information; means for subsequently reading out, under the control of the timing signal, the data signal transmitted from said first circuit, and means for checking the content of the extracted bit information signal, thereby detecting any error in transmission.

4. A data transmitting apparatus comprising: two transmission line circuits; a data transmitting device including means for converting data information to a serial binary signal and feeding it out to said first circuit, and means for logically synthesizing the data information and the bit synchronous information to form an auxiliary signal and feeding it out to said second circuit of said transmission line; and a data receiving device; including means for logically comparing the data signal transmitted from said first circuit and the auxiliary signal transmitted from said second circuit to extract a bit synchronous information signal; means for forming, from the extracted bit synchronous information signal, a timing signal for extracting the bit information; means for subsequently reading out, under the control of the timing signal, the data signal transmitted from the first circuit; and means for counting the number of timing signals, thereby checking the content of the extracted bit synchronous information signal to detect any error in transmission.

5. A data transmitting apparatus comprising; two signal transmission line circuits; a data transmitting device including means for converting data information to a serial binary signal and feeding it out to said first circuit, and means for logically synthesizing the data information and the bit synchronous information to form an auxiliary signal and feeding it out to said second circuit; and a data receiving device including: means for logically comparing the data signal transmitted from said first circuit and the auxiliary signal transmitted from said second circuit to extract a bit synchronous information signal; means for forming, from the extracted bit synchronous information signal, timing signals for extracting the bit information; means for subsequently reading out, under the control of the timing signals, the data signal transmitted from said first circuit; and means for measuring the duration of the timing signals and providing an indication of the termination thereof; and means for counting the number of the timing signals until the occurrence of said indication, thereby checking the content of the extracted bit synchronous information signal to detect any error in transmission.

* * * * *